(12) United States Patent
Canepa et al.

(10) Patent No.: US 10,346,058 B2
(45) Date of Patent: *Jul. 9, 2019

(54) DYNAMIC BANDWIDTH REPORTING FOR SOLID-STATE DRIVES

(71) Applicant: Seagate Technology LLC, Cupertino, CA (US)

(72) Inventors: Timothy L. Canepa, Los Gatos, CA (US); Ramdas P. Kachare, Cupertino, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,958

(22) Filed: Nov. 12, 2018

(65) Prior Publication Data

US 2019/0079680 A1 Mar. 14, 2019

Related U.S. Application Data

(63) Continuation of application No. 15/082,492, filed on Mar. 28, 2016, now Pat. No. 10,156,999.

(51) Int. Cl.
*G06F 3/06* (2006.01)
*G06F 13/16* (2006.01)
*G06F 12/02* (2006.01)

(52) U.S. Cl.
CPC .......... *G06F 3/0613* (2013.01); *G06F 3/065* (2013.01); *G06F 3/0611* (2013.01); *G06F 3/0619* (2013.01); *G06F 3/0625* (2013.01); *G06F 3/0652* (2013.01); *G06F 3/0653* (2013.01); *G06F 3/0659* (2013.01); *G06F 3/0679* (2013.01); *G06F 3/0688* (2013.01); *G06F 12/0246* (2013.01); *G06F 13/1668* (2013.01)

(58) Field of Classification Search
CPC ....... G06F 3/06–0689; G06F 12/00–16; G06F 13/1668–1694; G06F 2003/0691–0698; G06F 2212/7205; G06F 2212/7211
See application file for complete search history.

(56) References Cited

U.S. PATENT DOCUMENTS

| | | | |
|---|---|---|---|
| 8,826,270 B1 | 9/2014 | Lewis et al. | 718/1 |
| 8,830,716 B2 | 9/2014 | Feekes | 365/63 |
| 8,848,577 B2 | 9/2014 | Saund et al. | 370/254 |
| 2013/0080699 A1 | 3/2013 | Shigeta | 711/114 |

(Continued)

*Primary Examiner* — Nicholas J Simonetti
(74) *Attorney, Agent, or Firm* — Hall Estill Attorneys at Law (57) ABSTRACT

An apparatus includes a memory and a controller. The memory may be configured to store data. The controller may have a host interface circuit connectable to a host. The controller may be configured to process a plurality of input/output requests to read/write to/from the memory, compute a first bandwidth consumed by the controller while servicing the memory with one or more tasks hidden from the host, compute a second bandwidth of the memory that is available to the host through the host interface circuit based on the first bandwidth consumed by the controller, receive a hypothetical consumption of additional bandwidth by the host, update the second bandwidth based on the hypothetical consumption, and report the second bandwidth as updated to the host through the host interface circuit.

20 Claims, 6 Drawing Sheets

(56) References Cited

U.S. PATENT DOCUMENTS

| | | | |
|---|---|---|---|
| 2013/0173843 A1 | 7/2013 | Balakrishnan et al. | 711/103 |
| 2013/0262683 A1* | 10/2013 | Hayashi | H04L 47/70 709/226 |
| 2013/0297894 A1 | 11/2013 | Cohen | 711/154 |
| 2014/0095696 A1 | 4/2014 | Sala | 709/224 |
| 2014/0101379 A1 | 4/2014 | Tomlin | 711/103 |
| 2014/0108740 A1* | 4/2014 | Rafacz | G06F 12/0862 711/137 |
| 2014/0337598 A1 | 11/2014 | Rao | 711/167 |
| 2014/0365719 A1 | 12/2014 | Kuzmin et al. | 711/103 |
| 2015/0373105 A1* | 12/2015 | Okada | H04L 67/1095 709/219 |
| 2016/0117105 A1* | 4/2016 | Thangaraj | G06F 3/0616 711/103 |
| 2016/0210060 A1 | 7/2016 | Dreyer | |

\* cited by examiner

DYNAMIC BANDWIDTH REPORTING FOR SOLID-STATE DRIVES

This application relates to U.S. Ser. No. 15/082,492, filed Mar. 28, 2016, which is incorporated by reference in its entirety.

FIELD OF THE INVENTION

The invention relates to solid-state drives generally and, more particularly, to a method and/or apparatus for implementing dynamic bandwidth reporting for solid-state drives.

BACKGROUND

Access to storage is part of conventional server virtualization systems. In server virtualization systems, the servers run virtual machines that allow efficient and cost-effective utilization of an information technology infrastructure. Each server can host multiple virtual machines with a goal to maximize utilization of an underlying hardware infrastructure of central processor units, memory, network interfaces, and storage. Hosting too many virtual machines on a server commonly leads to unacceptable levels of performance degradation for the virtual machines. Hosting a conservative number of virtual machines causes underutilization of the infrastructure.

Hosting considerations related to storage are not straightforward. Two factors with respect to storage infrastructures are capacity and bandwidth. The storage capacity can be allocated on demand and can be thinly provisioned to support a higher number of virtual machines. The storage bandwidth criterion is hard to predict. Various virtual machines generate a wide range of input/output workloads and bandwidth demands. The storage bandwidth is also affected by a presence or absence of caching appliances in the system. If the available storage bandwidth is known dynamically, system software can try to optimally match the demand and availability. Currently, no dynamic and reliable mechanism is known by which the system software knows how much storage bandwidth is available at a given time.

It would be desirable to implement dynamic bandwidth reporting for solid-state drives.

SUMMARY

The invention concerns an apparatus including a memory and a controller. The memory may be configured to store data. The controller may have a host interface circuit connectable to a host. The controller may be configured to process a plurality of input/output requests to read/write to/from the memory, compute a first bandwidth consumed by the controller while servicing the memory with one or more tasks hidden from the host, compute a second bandwidth of the memory that is available to the host through the host interface circuit based on the first bandwidth consumed by the controller, receive a hypothetical consumption of additional bandwidth by the host, update the second bandwidth based on the hypothetical consumption, and report the second bandwidth as updated to the host through the host interface circuit.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing dynamic bandwidth reporting for solid-state drives that may (i) estimate a memory bandwidth consumed by a controller performing servicing operations in a drive, (ii) provide a host with an ability to control how the controller gathers drive statistics, (iii) account for hypothetical scenarios in the bandwidth calculations and/or (iv) be implemented as one or more integrated circuits.

A memory bandwidth available for host usage may vary dynamically due to the nature of the media in the memory. The media generally wear down over time and usage, resulting in higher error correction efforts. The media may also be subject to continuous recycling (e.g., garbage collection) and other internal management operations that consume the memory bandwidth at varying amounts over time. The memory generally has a certain amount of media interface bandwidth available based on number of read/write channels present and interface frequency. A varying portion of the available memory bandwidth may be consumed by a memory controller for internal housekeeping purposes. By calculating how much of the memory bandwidth is consumed by the internal housekeeping (or servicing) purposes, the memory controller may report to the host an estimated amount of the memory bandwidth still remaining for the host to use.

Figure 1:
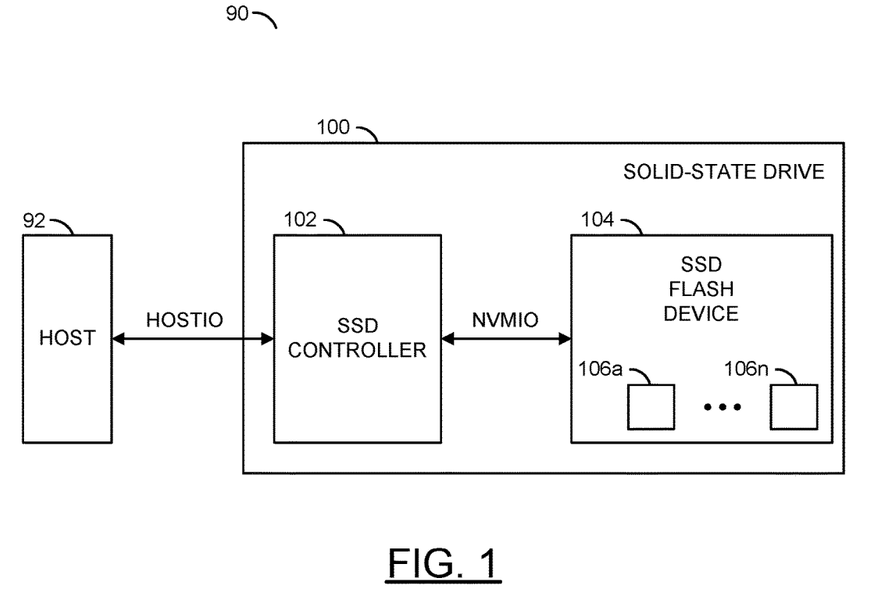
FIG. 1 is a block diagram of an apparatus.

Referring to FIG. 1, a block diagram of an example implementation of an apparatus 90 is shown. The apparatus (or circuit or device or integrated circuit) 90 implements a computer having a memory circuit. The apparatus 90 generally comprises a block (or circuit) 92 and a block (or circuit) 100. The circuit 100 generally comprises a block (or circuit) 102 and a block (or circuit) 104. The block 104 may comprise one or more blocks (or circuits) 106a-106n.

A signal (e.g., HOSTIO) may be exchanged between the circuit 92 and the circuit 102. The signal HOSTIO may comprise one or more host input/output signals (or components). The components of the signal HOSTIO generally include, but are not limited to, a logical address component used to access data in the circuit 100, a host command component that controls the circuit 100, a write data component that transfers write data from the circuit 92 to the circuit 102 and a read data component that transfers error corrected read data from the circuit 102 to the circuit 92.

A signal (e.g., NVMIO) may be exchanged between the circuit 102 and the circuit 104. The signal NVMIO may comprise one or more nonvolatile memory input/output signals (or components). The components of the signal NVMIO generally include, but are not limited to, a physical address component used to access data in the circuit 104, a memory command component that controls the circuit 104 (e.g., read or write commands), a write codeword component that carries error correction coded and cyclical redundancy check protected write codewords written from the circuit 102 into the circuit 104 and a read codeword component that carries the error correction coded codewords read from the circuit 104 to the circuit 102.

The circuit 92 may implement a host. The host 92 is generally operational to read data from and write data to the circuit 104 via the circuit 102. When reading or writing, the host 92 may transfer a logical address value in the signal HOSTIO to identify which set of data is to be written into or read from the circuit 104. The logical address value is generally within a logical address range of the circuit 100. The logical address value may address individual data units, such as SATA (e.g., serial-advanced technology attachment) sectors.

The circuit 100 may implement a solid-state drive (SSD). The drive 100 is generally operational to store data generated by the host 92 and return the data to the host 92. According to various embodiments, the drive 100 may comprise one or more of: nonvolatile semiconductor devices, such as NAND flash devices, phase change memory (e.g., PCM) devices, or resistive RAM (e.g., ReRAM) devices; portions of a solid-state drive having one or more nonvolatile devices; and any other volatile or nonvolatile storage media.

The circuit 102 may implement a controller. The controller 102 is generally operational to control reading from, writing to, and servicing of the circuit 104. The controller 102 may include an ability to decode the read codewords received from the circuit 104. The resulting decoded data may be presented to the host 92 via the signal HOSTIO and/or re-encoded and written back into the circuit 104 via the signal NVMIO. The controller 102 may also be configured to encode data received from the host 92 and/or decoded from the memory 104 to generate write codewords. The resulting write codewords may be presented to the memory 104 via the signal NVMIO for storage. The controller 102 generally comprises one or more integrated circuits (or chips or die) implementing the controller of one or more solid-state drives, embedded storage, or other suitable control applications.

The circuit 104 may implement a memory comprising the one or more circuits 106a-106n. The circuits 106a-106n may be implemented as memory circuits (or chips, or die, or devices). According to various embodiments, the memory 104 generally comprises one or more nonvolatile semiconductor memory devices. In some embodiments, the memory 104 may include one or more volatile semiconductor memory devices. The memory 104 may be operational to store data in a volatile and/or nonvolatile condition. When data is read from or written to the memory 104, the memory 104 may access a set of memory cells (e.g., multiple bits) identified by an address (e.g., a physical address) in the signal NVMIO. The address is generally within a physical address range of the memory 104. In some embodiments, the memory 104 may be implemented as a volatile memory and/or a nonvolatile memory.

In various embodiments, the circuits 106a-106n may be implemented as NAND flash memory, NOR flash memory, flash memory using polysilicon or silicon nitride technology-based charge storage cells, two-dimensional or three-dimensional technology-based nonvolatile memory, ferromagnetic memory, phase-change memory, racetrack memory, stacked memory, resistive random access memory, magnetic random access memory and similar types of memory devices and/or storage media. However, other nonvolatile memory technologies may be implemented to meet the criteria of a particular application. In some embodiments, the circuits 106a-106n may be implemented as volatile memory circuits and/or nonvolatile memory circuits.

As part of controlling the memory 104, the controller 102 may be configured to process a plurality of input/output requests to read/write to/from the memory 104. The controller 102 may also track multiple statistics of the memory 104, index multiple tables with the statistics of the memory 104 to determine multiple parameters, utilize the multiple parameters to compute a service bandwidth consumed by the controller 102 while servicing the memory 104 with one or more tasks hidden from the host 92, and report to the host 92 an estimated bandwidth of the memory 104 that is available to the host 92 based on the service bandwidth consumed by the controller 102. The estimated bandwidth reported to the host 92 generally indicates an amount of data that may be transferred per second between the host 92 and the controller 102 at one or more latencies. The estimated bandwidth may be reported as a read bandwidth available to the host 92 and a write bandwidth available to the host 92.

In various embodiments, the controller 102 may be configured to report the estimated bandwidth to the host 92 upon the occurrence of one or more conditions. The conditions may include, but are not limited to, a dynamic event, a periodic event, an inquiry from the host 92, a power-on event, a beginning of a recycling (e.g., garbage collection) task, and/or an end of the recycling task. Other conditions may be implemented to meet the design criteria of a particular application.

In some embodiments, the controller 102 may receive one or more instructions from the host 92. The controller 102 may control how one or more of the statistics of the memory 104 are tracked based on the received instructions. In some embodiments, the controller 102 may receive a hypothetical consumption of additional bandwidth by the host 92. The controller 102 may update the estimated bandwidth reported to the host 92 based on the hypothetical consumption.

The statistics (or states) of the memory 104 generally comprise a total amount of time that the memory 104 has been powered, a total number of program/erase cycles that have been performed, a current over-provisioning amount of storage space available, and/or an amount of free storage space currently available. The controller 102 may estimate one or more of the statistics of the memory 104 based on operations that modify a size of user data being transferred between the memory 104 and the controller 102. The data-size modifying operations may include, but are not limited to, a code rate used in an error correction code operation, a compression operation, and/or a trim operation. Other operations may be implemented to meet the design criteria of a particular application.

Figure 2:
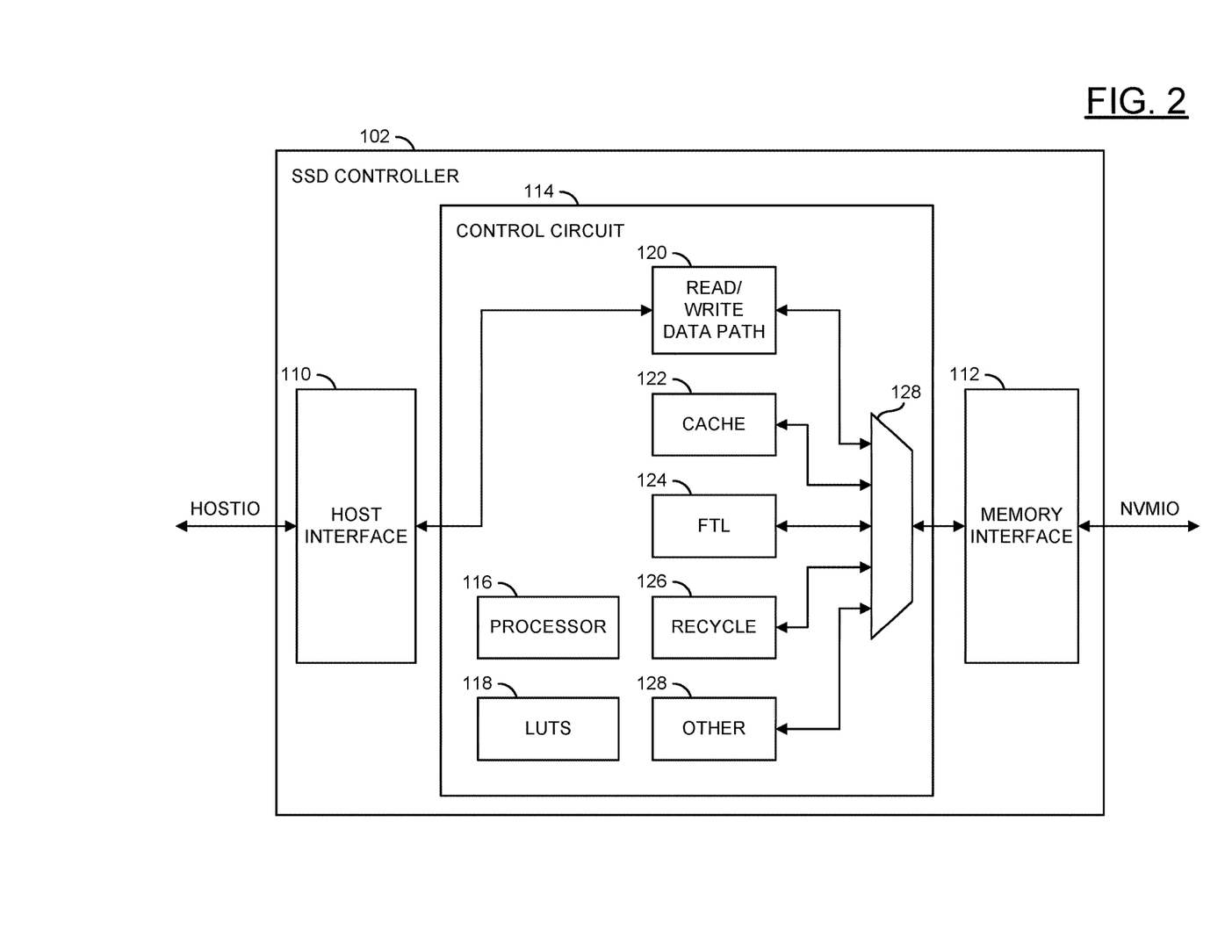
FIG. 2 is a block diagram of a controller.

Referring to FIG. 2, a block diagram of an example implementation of the controller 102 is shown in accordance with an embodiment of the present invention. The controller 102 generally comprises a block (or circuit) 110, a block (or circuit) 112 and a block (or circuit) 114. The circuit 114 generally comprises a block (or circuit) 116, a block (or circuit) 118, a block (or circuit) 120, a block (or circuit) 122, a block (or circuit) 124, a block (or circuit) 126, and a block (or circuit) 128. The signal HOSTIO may be exchanged with the circuit 110. The signal NVMIO may be exchanged with the circuit 112.

The circuit 110 may implement a host interface circuit. The host interface 110 is generally operational to provide communication with the host 92 via the signal HOSTIO. Other signals may be implemented between the host 92 and host interface 110 to meet the criteria of a particular application. In various embodiments, the host interface 110 may process multiple access operations to/from the host 92.

The circuit 112 may implement a nonvolatile memory (e.g., flash) interface circuit. The memory interface 112 is generally operational to provide communication with the memory 104 via the signal NVMIO. Other signals may be implemented between the memory 104 and memory interface 112 to meet the design criteria of a particular application. In various embodiments, the memory interface 112 may process multiple read/write operations to/from the memory 104.

The circuit 114 may implement a control circuit. The control circuit 114 is generally operational to control writing data received from the host 92 into the memory 104, reading data from the memory 104 for transfer to the host 92, servicing the memory 104, and calculating the estimated bandwidth of the memory 104 available to the host 92. The control circuit 114 generally communicates with the memory 104 via the memory interface 112. The host 92 may communicate with the control circuit 114 via the host interface 110.

The circuit 116 may implement a processor. The processor 116 is generally operational to command and/or assist with the multiple read/write requests and to control one or more reference voltages used in the memory 104 to read data (or codewords). In various embodiments, the processor 116 may be operational to calculate the service bandwidth consumed while servicing the memory 104. The processor 116 may also be operational to calculate the estimated bandwidth of the memory 104 available to the host 92. The service bandwidth may be transferred to the host 92 through the host interface 110.

The circuit 118 may implement one or more lookup tables (LUTs). The LUTs 118 may be operational to store data that transforms the statistics of the memory 104 into the parameters used by the processor 116 to calculate the service bandwidth and the estimated bandwidth. In various embodiments, each LUT 118 may be stored separately. In other embodiments, one or more of the LUTs 118 may be merged together.

The circuit 120 may implement a read/write data path. The data path 120 may be operational to transfer data between the memory 104 and the host 92. The transfers may utilize the host interface 110 to communicate with the host 92, and the memory interface 112 to communicate with the memory 104.

The circuit 122 may implement a cache circuit. The cache 122 may be operational to cache data written to and/or read from the memory 104. In various embodiments, the cache 122 may be arranged as a single layer cache for user data. From time to time, data in the cache 122 may be offloaded to the memory 104. The cache offload operation may consume a significant amount of bandwidth between the controller 102 and the memory 104. The cache 122 may implement a variety of write policies, set associations, and/or replacement policies. The write policies may include, but are not limited to, write-through and write-back (or write-behind). The replacement policies generally include least recently used most recently used, least-frequently used, random replacement, segmented least-recently used and/or pseudo-least-recently used. Other replacement policies may be implemented to meet the design criteria of a particular application. The set associations generally include, but are not limited to, direct mapped, 2-way set associative and/or n-way set associative.

The circuit 124 may implement a flash translation layer (FTL) circuit. The flash translation layer 124 may be operational to perform a logical address to physical address translation using map tables and other related data structures. Since each write generally happens at a new location in the memory 104, the map tables and related data structures may constantly change. The changed or dirty portions of the maps and/or data structures may be periodically written to the memory 104 for nonvolatile storage. The writes generally consume additional bandwidth between the controller 102 and the memory 104. The nonvolatile storage of the maps and data structures may provide robust and fast drive recovery in case of a surprise power failure.

The circuit 126 may implement a recycle circuit. The recycle circuit 126 may be operational to implement a recycling (e.g., garbage collection) operation. The recycling operation may consume a significant amount of the bandwidth between the controller 102 and the memory 104. Before a block is erased, any valid user data present in that block may be moved to another block by the recycling operation. Each page in the memory 104 is erased before new data may be written (or programmed). The erase operation may be performed at a block level, with each block containing many pages. Such recycling of the blocks may be performed at regular intervals to create free space. The rate of the recycling operation, and in turn, an amount of the memory bandwidth consumed generally depends upon an amount of over-provisioned capacity. Higher over-provisioned capacity generally results in a lower garbage collection rate and so a lower memory bandwidth may be consumed by the recycling operation.

The circuit 128 may represent other operations that impact the service bandwidth of the memory 104. For example, some solid-state drive architectures may compress user data. The data compression generally increases the effective over-provisioning level as the user data consumes less space in the memory 104. An actual level of the data compression may depend upon the entropy of the user data being written. The resulting effective over-provisioning level may be a dynamic and complex variable that may have a significant impact on the estimated bandwidth available to the host 92.

Figure 3:
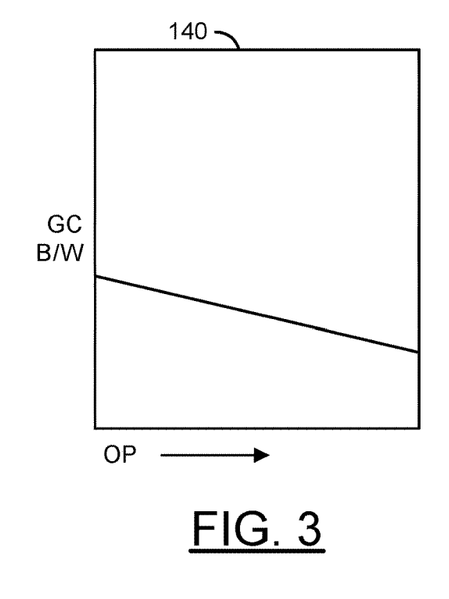
FIG. 3 is a graph of a service bandwidth due to garbage collection operations as a function of over-provisioning.

Referring to FIG. 3, a graph 140 of an example relationship between the service bandwidth (B/W) due to the garbage collection (GC) operation as a function of over-provisioning (OP) is shown. As illustrated in the example, as the over-provisioning increases, the effect of the garbage collection operation on the service bandwidth decreases. The effect may have a non-linear relationship. Other relationships may be implemented to meet the design criteria of a particular application. A table of values representing the relationship may be generated for the graph 140 and stored in the LUTs 118.

Figure 4:
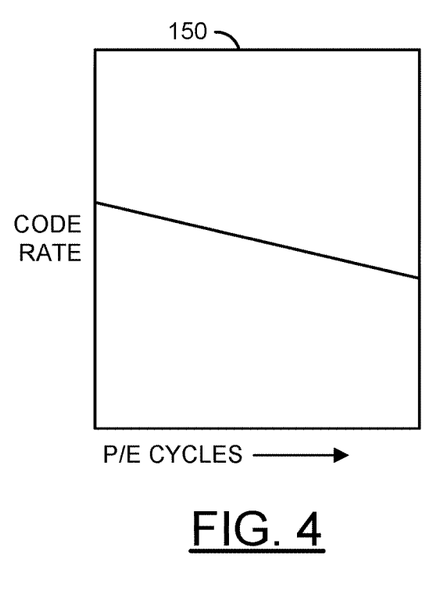
FIG. 4 is a graph of the service bandwidth due to a code rate as a function of program/erase cycles currently performed.

Referring to FIG. 4, a graph 150 of an example relationship between the service bandwidth due to a code rate as a function of program/erase (P/E) cycles currently performed is shown. Over time, measured in terms of a total number of program/erase cycles currently performed, flash memory endurance may degrade resulting in a higher raw bit error rate (RBER). The higher raw bit error rate may affect error correction efforts spent in the controller 102. The higher raw bit error rate may also increase the service bandwidth and increase a latency seen by host applications running in the host 92. The effect of the program/erase cycles on the code rate may have a non-linear relationship. Other relationships may be implemented to meet the design criteria of a particular application. A table of values representing the relationship may be generated for the graph 150 and stored in the LUTs 118.

Figure 5:
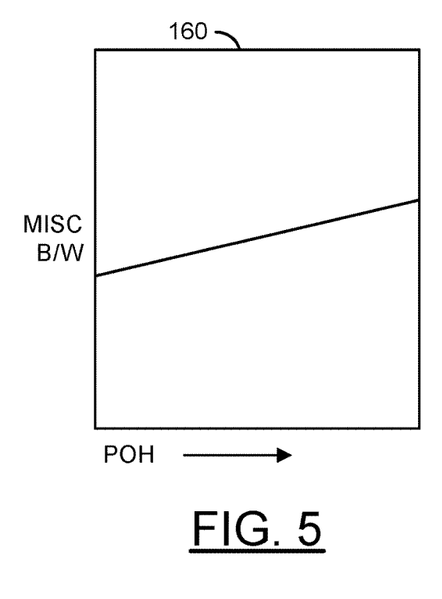
FIG. 5 is a graph of the service bandwidth due to miscellaneous operations as a function of power-on hours.

Referring to FIG. 5, a graph 160 of an example relationship between the service bandwidth (B/W) due to miscellaneous (MISC) operations as a function of power-on hours (POH) is shown. Endurance of flash memory may degrade over time as measured in terms of the power-on hours. The degradation generally results in a higher raw bit error rate. An effect of the degraded endurance over time may be seen in terms of error correction code rate usage. Because of higher bit error rates due to the increasingly degraded flash quality, stronger error correction codes may be used by the controller 102, resulting in lower code rates. The lower code rates generally reduce the effective over-provisioning. Reducing the effective over-provisioning may, in turn, increase a write amplification. A net effect of all such factors may be a reduced estimated bandwidth available to the host applications. The effect may have a non-linear relationship. Other relationships may be implemented to meet the design criteria of a particular application. A table of values representing the relationship may be generated for the graph 160 and stored in the LUTs 118.

The cache, the FTL, the recycling, and other functions and factors together may take up significant amounts of the memory bandwidth in servicing the memory 104. The memory bandwidth consumed may not remain fixed/static over time. An estimated bandwidth (B/W) available for the host 92 to use may be provided by formula 1 as follows:

$$\text{Host } B/W = \text{Flash } B/W - (\text{Recycling } B/W + \text{FTL } B/W + \text{Cache offload } B/W + \text{Miscellaneous } B/W) \quad (1)$$

The flash B/W value may be a fixed value of the memory 104 and is generally based on the design of the memory 104. The recycling B/W value may be the service bandwidth consumed by the garbage collection operations. The FTL B/W value may be the service bandwidth consumed by the flash translation layer operations. The cache offload B/W value may be an average service bandwidth consumed while offloading data from the cache 122 to the memory 104. The miscellaneous B/W value may be a sum of other operations that increase the service bandwidth consumed by the controller 102.

The controller 102 may compute the individual terms in formula 1. The computations may be complex and in various embodiments, some approximation may be employed. Some of the factors involved may be programmed in the LUTs 118 as characterization tables. The controller 102 may keep track of the power-on hours value, the program/erase cycle count, and the current over-provisioning level. The parameters may be used as an index in the characterization tables stored in the LUTs 118 to help compute the memory bandwidth used by the internal service functions in the controller 102. Once the service bandwidth is computed, the estimated bandwidth of the memory 104 available to the host 92 may be calculated and reported.

Several (e.g., three) groups may be used in the bandwidth reporting calculations. One group may be the current bandwidth calculations that calculate the current bandwidth being used. Another group may be the remaining available bandwidth that are computed using a combination of one or more selected formulas. Yet another group may be scenario planning bandwidth calculations used in conjunction with the current bandwidth calculation group and the remaining available bandwidth group to estimate bandwidth requirements when a new workload is added.

In general, the host 92 may be interested in the total bandwidth, the current bandwidth, what the bandwidth might be if a new workload is applied, and/or what the new bandwidth may be if a workload is removed. In various embodiments, the estimated bandwidth report to the host 92 may be characterized as an "adjusted" bandwidth and a "raw" bandwidth. If the raw bandwidth is reported, the host 92 may infer the adjusted bandwidth from raw bandwidth. Consider an example when 4,000 bytes (4K) of data is read from the memory 104 by the host 92. The amount of data read from memory 104 to retrieve the 4K of data may vary based on the error correction code rate and/or how many codewords the 4K of data spans. A count of the codewords and respective sizes generally represents the raw bandwidth consumed to read the 4K of data.

Determining the current bandwidth consumed on the drive 100 may be accomplished by collecting bandwidth on the drive 100 over a specified interval. In various embodiments, the interval may be a configuration parameter. In still further embodiments, the interval may be set by the host 92. In still further embodiments, the collection interval may be determined by a sampling interval of the host 92. In various embodiments, the consumed bandwidth information reported generally consists of a read bandwidth, a write bandwidth and a bandwidth consumed by internal operations over the sampling interval for the entire drive 100. Internal operations may include, but are not limited to, the garbage collection, wear leveling, read disturb handling, retention management and maintenance of FTL and media management structures stored on the media.

In various embodiments, the bandwidth consumption may be tracked in both the adjusted and the raw form. The adjusted form of the bandwidth generally consists of the bandwidth as observed by the host 92. The raw bandwidth may consist of actual resources used on the controller 102. Raw data may be tracked to simplify remaining available bandwidth calculations.

The reported bandwidth may be made corresponding to one or more applications executing on the host 92. An identification of bandwidths associated with executing applications is generally based on the regions of storage associated with the applications. In such cases, the utilized storage may be associated with each application. In some embodiments, the associations may be provided from the host 92, as to what application owns what region. In other embodiments, the host 92 may tag requests as being from particular applications.

In various embodiments, the effective over-provisioning may also be reported. The effective over-provisioning may be defined as the percentage of unused space on the drive 100 relative to a formatted capacity of the drive 100 and may consider spare capacity plus trimmed space, unused space, and space containing invalid data. The effective over-provisioning (OP) may be approximated by formula 2 as follows:

$$\text{Effective } OP = \left( \text{Raw Capacity} - \left( \frac{(\text{Formatted Capacity} - \text{Trimmed Data}) \times \text{Avg Entropy}}{\text{Average Code Rate}} \right) - \right. \quad (2)$$

$$\left(\frac{FTL\ \text{Overhead}}{\text{Avg } FTL\ \text{Code Rate}}\right)\bigg/\left(\frac{\text{Formatted Capacity}}{AverageCodeRate}\right)$$

Where: the raw capacity may be a raw capacity of the memory 104; the formatted capacity may be a capacity of the drive 100 reported to the host 92; the trimmed data may be data the host 92 has reported to the drive 100 that is no longer in use by the host 92; the average entropy may be an average compressibility of the data across all data stored on the drive 100, if compression is employed by the controller 102; the FTL overhead may be an amount of space on the memory 104 occupied by the FTL structures and statistics; the average code rate may be an average error correction code rate used for data stored on the drive 100; and the average FTL code rate is generally an average error correction code rate used for the FTL structures and statistics. In various embodiments, the effective over-provisioning calculation may take into account overhead for outer codes used to protect against block, plane and/or die failures.

The remaining available bandwidth (BW) computation may be provided by formula 3 as follows:

Remaining Available BW=Total Available BW−Current BW　　(3)

The remaining available bandwidth is generally an analytical calculation based on a number of factors and inputs. The remaining raw bandwidth and resources may be calculated by subtracting the current raw bandwidth from a total raw bandwidth, a raw flash bandwidth remaining for read and write, a raw flash bus bandwidth remaining, a raw central processor unit (CPU) resources remaining, a raw buffer space and bandwidth remaining, a raw internal bus bandwidth remaining, and a raw host interface bandwidth remaining. The remainder generally represents the remaining resources and bandwidth on the controller 102. Thereafter, based on controller utilization and resources, the following statistics may be use to determine the remaining bandwidth based on a selected workload: CPU utilization; effective over-provisioning (used to compute remaining the write bandwidth); a speed at which free memory space credit is earned may also be considered since distributions may vary; the average code rate and the program/erase cycles that may impact the read bandwidth; and one or more application performance profiles that have been collected at various effective over-provisioning levels and capacities. The profiles may be stored in a table. The host 92 may identify which applications are using what regions along with corresponding profiles.

Various methods may be implemented for calculating and/or estimating the available drive bandwidth. For example, various representative workloads may be run against the drive 100 and the available bandwidths and latencies for the workloads are recorded. The utilization by workload may be scaled from 0% to 100% and subsequently stored in a workload table. Scenario planning may be derived from taking the remaining bandwidth and indexing the workload table to see the effect. The host 92 may find that adding a particular workload could determinately impact current workloads running on the drive 100. The host 92 may also consider a scenario inquiry where a given workload may be moved to determine if a positive impact is provided to other workloads.

Figure 6:
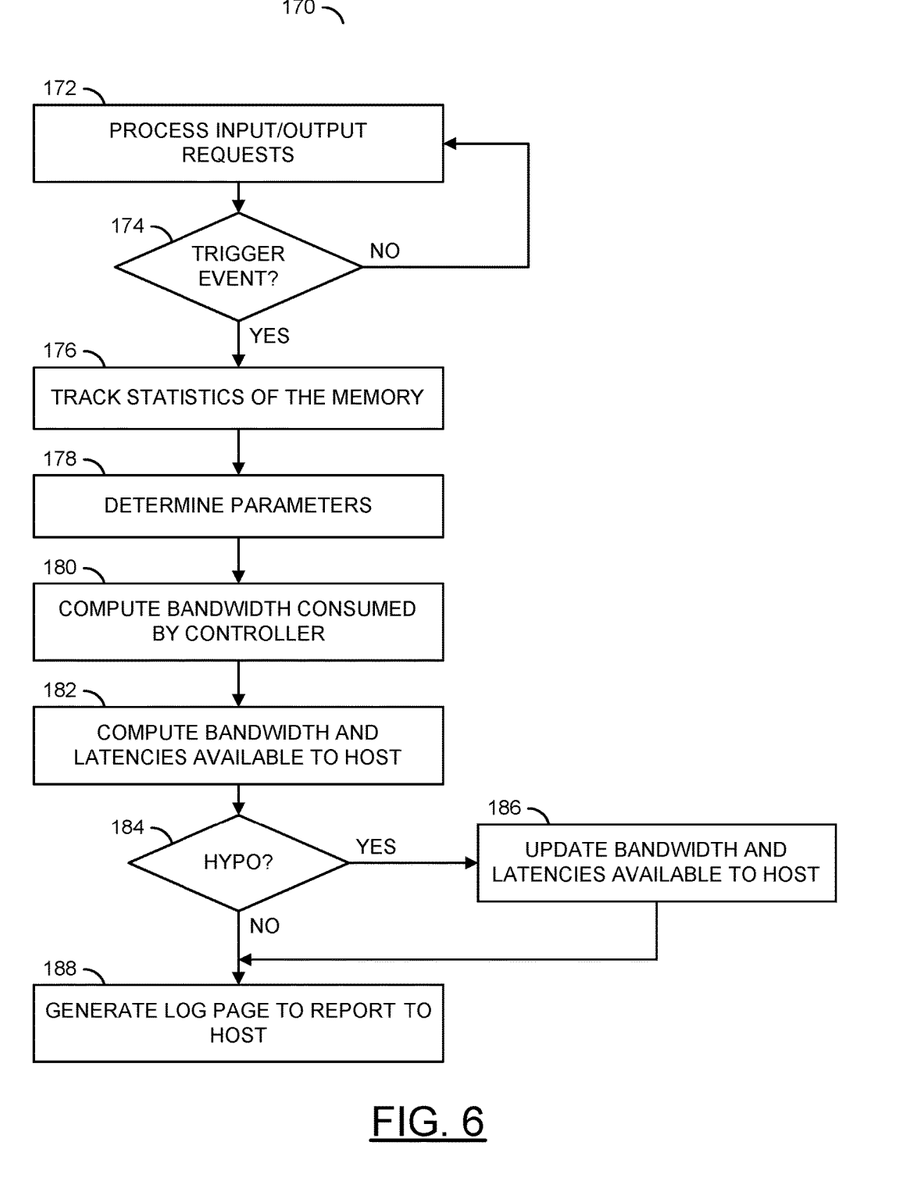
FIG. 6 is a flow diagram of a method for dynamic bandwidth reporting.

Referring to FIG. 6, a flow diagram of an example method 170 for the dynamic bandwidth reporting is shown. The method (or process) 170 may be implemented in the drive 100. The method 170 generally comprises a step (or state) 172, a decision step (or state) 174, a step (or state) 176, a step (or state) 178, a step (or state) 180, a step (or state) 182, a decision step (or state) 184, a step (or state) 186, and a step (or state) 188.

In the step 172, the controller 102 (e.g., the control circuit 114 and/or the memory interface 112) may process a plurality of read/write operations to/from the memory 104. While processing the read/write operations, the controller 102 may monitor the drive 100 for the occurrence of one or more triggering events in the step 174. If no triggering events (or conditions) are detected, the controller 102 may continue processing the read/write (or input/output) requests in the step 172. The triggering events generally include one or more dynamic events, one or more periodic events, one or more inquiries from the host 92, each power-on event, each beginning of a garbage collection task, and/or each end of the garbage collection task. Other conditions may be implemented to meet the design criteria of a particular application.

When a triggering event is detected, the controller 102 may update the tracking of the one or more statistics of the drive 100 in the step 176. Based on the updated statistics, the controller 102 may compute parameters corresponding to the statistics in the step 178. In the step 180, a service bandwidth consumed by the controller 102 based on the parameters may be computed by the controller 102. Once the service bandwidth is known, the controller 102 may compute the estimated bandwidth and latencies available to the host 92 in the step 182.

A check may be performed in decision step 184 to determine if the host 92 has provided a hypothetical (or "what if") scenario to the controller 102. If the host 92 has presented a hypothetical condition for the controller 102 to consider, the controller 102 may update the estimated bandwidth and the latencies in the step 186. Once the estimated bandwidth and the latencies have been updated, or if no hypothetical case was received, the controller 102 generally reports the estimated bandwidth and the latencies in the step 188 to the host 92.

In some embodiments, the host 92 may check for the hypothetical effects of additional capacity allocation on bandwidth availability in the drive 100 in current use before an actual allocation of the additional capacity is made. The controller 102 may report back what the estimated bandwidth might be based on the new potential allocation. In various embodiments, the "what if" analysis may include information about additional resource utilizations, including added read/write workloads, to assess the resulting performance of the drive 100. Based on the feedback in the report, the host 92 may take appropriate action to allocate additional capacity from the drive 100, allocate some of the additional capacity from the drive 100, or allocate none of the additional capacity from the drive 100. The dynamic bandwidth reporting feature generally enables such analysis for the host 92 that may be useful for optimal utilization of the storage infrastructure.

Once the bandwidth computations are achieved, the estimated bandwidth of the memory 104 available to the host 92 may be reported to the host 92. In various embodiments, the reporting may be implemented as a vendor specific log page generated by the controller 102 and readable by the host 92. Various host interface protocols, such as nonvolatile memory host controller interface specification express (NVMe), serial attached small computer system interface (SAS), and/or serial-advanced technology attachment (SATA), generally allow the host 92 to read the vendor unique log pages. An example of a vendor unique log page report entry may be provided in Table I as follows:

TABLE I

| N: 0 | Available storage bandwidth in MBPS | Available storage latency in microseconds |
| --- | --- | --- |

The value N:0 in the left field generally represents a size of a log entry used for reporting available bandwidth (e.g., N=31 for a 32 bit log entry and may be divided into 16 bits for bandwidth and 16 bits for latency). The value in the middle field may present the estimated bandwidth of the memory 104 that is available to the host 92. The estimated bandwidth may be expressed in units of megabits per second (MSPS) The value in the right field may present the estimated storage latency that the host 92 may expect. The storage latency may be expressed in units of microseconds. Other vendor specific log pages and/or reporting mechanisms may be implemented to meet the design criteria of a particular application.

Figure 7:
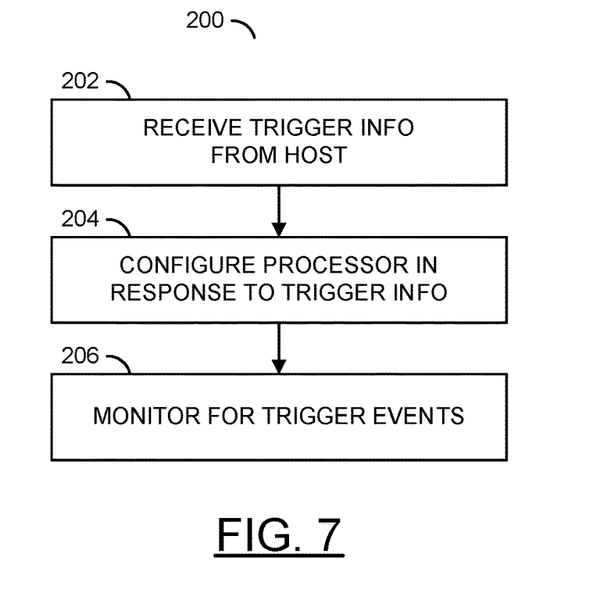
FIG. 7 is a flow diagram of a reporting setup.

Referring to FIG. 7, a flow diagram 200 of an example setup of the reporting operation is shown. The method (or process) 200 may be implemented in the drive 100. The method 200 generally comprises a step (or state) 202, a step (or state) 204, and a step (or state) 206.

The controller 102 may report the estimated storage bandwidth on demand of the host 92, at periodically events and/or at certain trigger events (or points). Examples of the triggering events may include, but are not limited to, time-based events (e.g., every ten seconds, every minute, every hour, etc.). Examples of non-periodic events may include a power-on condition, and internal events such as a start of garbage collection, an end of garbage collection, and/or a start of a cache offload. Other events may be implemented to meet the design criteria of a particular application.

In the step 202, the controller 102 may receive trigger information from the host 92. The processor 116 may be configured in the step 204 to monitor for the triggering events per the trigger information received from the host 92. In the step 206, the controller 102 generally monitors the drive 100 for occurrences of any one or more of the triggering events (e.g., the step 174 in FIG. 6).

Figure 8:
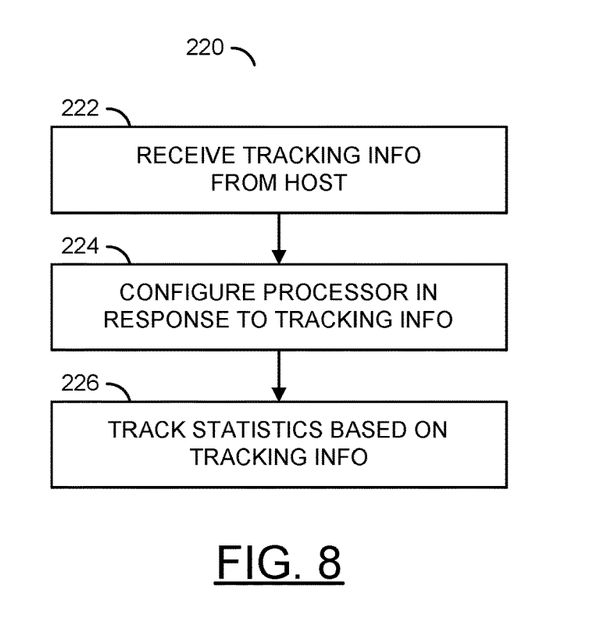
FIG. 8 is a flow diagram of a tracking setup.

Referring to FIG. 8, a flow diagram 220 of an example setup of the tracking is shown. The method (or process) 220 may be implemented in the drive 100. The method 220 generally comprises a step (or state) 222, a step (or state) 224, and a step (or state) 226.

The controller 102 may receive tracking information from the host 92 in the step 222. The processor 116 may be configured in the step 224 to track the statistics of the memory 104 per the tracking information received from the host 92. In the step 226, the controller 102 generally tracks the statistics of the memory 104 in accordance with the tracking information (e.g., the step 176 in FIG. 6).

The statistics of the memory 104 that are tracked may be predefined for the controller 102 (e.g., pre-programmed at manufacturing time). How the statistics are tracked may be programmable by the host 92. For example, the controller 102 may be measuring the service bandwidth consumed for cache offloads over some period of time. Consider a burst of activity by a virtual machine executing on the host 92. The burst may result in a high rate of cache offloads during a window. If the measuring period for the cache offload is long compared with the burst window, the burst may cause a small average increase in the calculated service bandwidth consumed by the controller 102 due to the cache offloads. If the measuring period is about the same length as the burst window, the calculated service bandwidth consumed by the controller 102 may increase significantly during the burst. In some embodiments, the host 92 may want to know the average estimated bandwidth available based on small measuring periods. In other embodiments, the host 92 may want to know the average estimated bandwidth available based on long measuring periods. Different hosts 92 may program the measuring period (how to gather the cache offload statistics) into the controller 102 to meet the design criteria of a particular application.

Figure 9:
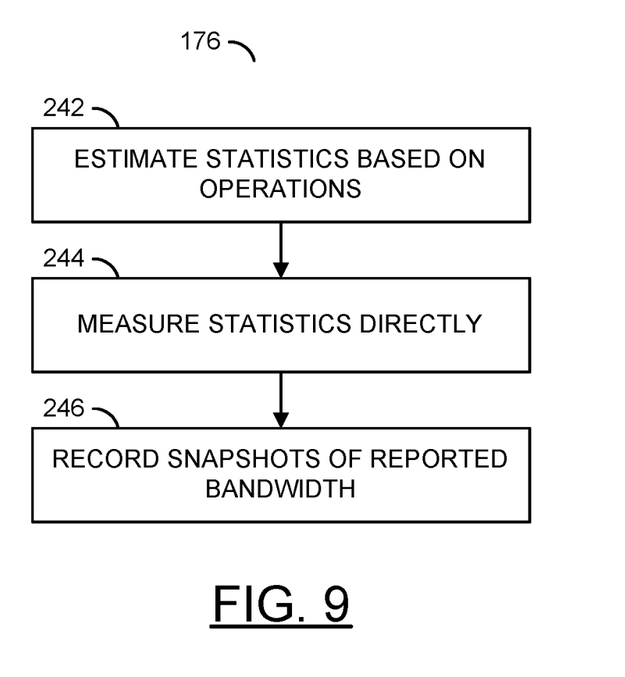
FIG. 9 is a detailed flow diagram of a tracking step of FIG. 6.

Referring to FIG. 9, a detailed flow diagram of the tracking step 176 is shown. The step (or method or process) 176 may be implemented in the drive 100. The step 176 generally comprises a step (or state) 242, a step (or state) 244, and a step (or state) 246.

In the step 242, the controller 102 may estimate elements of the service bandwidth consumption based on operations performed within the drive 100. The operations may include, but are not limited to, the code rate used in the error correction code operation, the compression operation, and the trim operation. The controller 102 may measure some statistics of the memory 104 directly in the step 244. The measured statistics may include, but are not limited to, the total amount of time that the memory 104 has been, the total number of program/erase cycles that have been performed, the amount of over-provisioning currently available, and the amount of free space currently available.

Other usages of the bandwidth monitoring may be included in the controller 102 and/or the host 92. For example, in the step 246, the controller 102 or host 92 may store snapshots of the reported storage bandwidth over time. The snapshots may be subsequently used to analyze how the drive 100 is behaving and fine tune the performance and/or develop better techniques to utilize the bandwidth.

The functions and structures illustrated in the diagrams of FIGS. 1 to 9 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element. As used herein, the term "simultaneously" is meant to describe events that share some common time period but the term is not meant to be limited to events that begin at the same point in time, end at the same point in time, or have the same duration.

While the invention has been particularly shown and described with reference to embodiments thereof, it will be understood by those skilled in the art that various changes in form and details may be made without departing from the scope of the invention.

The invention claimed is:

1. An apparatus comprising:
   a memory configured to store data; and
   a controller having a host interface circuit connectable to a host, wherein the controller is configured to
      process a plurality of input/output requests to read/write to/from the memory,
      compute a first bandwidth consumed by the controller while servicing the memory with one or more tasks hidden from the host,
      compute a second bandwidth of the memory that is available to the host through the host interface circuit based on the first bandwidth consumed by the controller,
      receive a hypothetical consumption of additional bandwidth by the host,
      update the second bandwidth based on the hypothetical consumption, and
      report the second bandwidth as updated to the host through the host interface circuit.

2. The apparatus according to claim 1, wherein the memory and the controller form part of a solid-state drive.

3. The apparatus according to claim 1, wherein the controller is further configured to report the second bandwidth to the host in response to at least one of a dynamic event, a periodic event, an inquiry from the host, a power-on event, a beginning of a garbage collection task, an end of the garbage collection task or any combination thereof.

4. The apparatus according to claim 1, wherein the second bandwidth reported to the host indicates an amount of data that can be transferred per second between the host and the controller through the host interface circuit.

5. The apparatus according to claim 1, wherein the controller is further configured to
   update a storage latency available to the host based on the hypothetical consumption, and
   report the storage latency as updated to the host through the host interface circuit.

6. The apparatus according to claim 1, wherein the controller is further configured to
   receive one or more instructions from the host, and
   control how one or more of a plurality of statistics of the memory are tracked based on the one or more instructions.

7. The apparatus according to claim 6, wherein the first bandwidth is based on the plurality of statistics of the memory.

8. The apparatus according to claim 6, wherein the plurality of statistics of the memory further include an amount of free space currently available in the memory.

9. The apparatus according to claim 6, wherein the controller is further configured to estimate one or more of the plurality of statistics of the memory based on one or more operations that modify a size of user data being transferred between the memory and the controller, and the one or more operations comprise one or more of a code rate used in an error correction code operation, a compression operation, a trim operation or any combination thereof.

10. A method for dynamic bandwidth reporting to a host, comprising the steps of:
    processing a plurality of input/output requests in a controller to read/write to/from a memory;
    computing a first bandwidth consumed by the controller while servicing the memory with one or more tasks hidden from the host;
    computing a second bandwidth of the memory that is available to the host through a host interface circuit based on the first bandwidth consumed by the controller;
    receiving a hypothetical consumption of additional bandwidth by the host;
    updating the second bandwidth based on the hypothetical consumption; and
    reporting to the host the second bandwidth as updated to the host through the host interface circuit.

11. The method according to claim 10, wherein the steps are performed in a solid-state drive.

12. The method according to claim 10, wherein the second bandwidth is reported to the host in response to at least one of a dynamic event, a periodic event, an inquiry from the host, a power-on event, a beginning of a garbage collection task, an end of the garbage collection task or any combination thereof.

13. The method according to claim 10, wherein the second bandwidth reported to the host indicates an amount of data that can be transferred per second between the host and the controller.

14. The method according to claim 10, further comprising the steps of:
    updating a storage latency available to the host based on the hypothetical consumption; and
    reporting the storage latency as updated to the host.

15. The method according to claim 10, further comprising the steps of:
    receiving one or more instructions from the host; and
    controlling how one or more of a plurality of statistics of the memory are tracked based on the one or more instructions.

16. The method according to claim 15, wherein the first bandwidth is based on the plurality of statistics of the memory.

17. The method according to claim 15, wherein the plurality of statistics of the memory further include an amount of free space currently available in the memory.

18. The method according to claim 15, further comprising the step of:
    estimating one or more of the plurality of statistics of the memory based on one or more operations that modify a size of user data being transferred between the memory and the controller, wherein the one or more operations comprise one or more of a code rate used in an error correction code operation, a compression operation, a trim operation or any combination thereof.

19. An apparatus comprising:
    a memory interface circuit configured to process a plurality of read/write operations to/from a memory;
    a host interface circuit connectable to a host; and
    a control circuit configured to
       compute a first bandwidth consumed by the control circuit while servicing the memory with one or more tasks hidden from the host, compute a second bandwidth of the memory that is available to the host through the host interface circuit based on the first bandwidth consumed by the controller, receive a hypothetical consumption of additional bandwidth by the host, update the second bandwidth based on the hypothetical consumption, and report the second bandwidth as updated to the host through the host interface circuit.

20. The apparatus according to claim 19, wherein the memory interface circuit, the host interface circuit and the control circuit form part of a solid-state drive.

* * * * *